United States Patent
Fujita

(10) Patent No.: US 6,707,213 B2
(45) Date of Patent: Mar. 16, 2004

(54) HYBRID MAGNET TYPE DC MOTOR

(75) Inventor: Kazuhiro Fujita, Aichi-ken (JP)

(73) Assignee: ASMO Co., Ltd., Kosai (JP)

( * ) Notice: Subject to any disclaimer, the term of this patent is extended or adjusted under 35 U.S.C. 154(b) by 17 days.

(21) Appl. No.: 10/407,324

(22) Filed: Apr. 4, 2003

(65) Prior Publication Data

US 2003/0189385 A1 Oct. 9, 2003

(30) Foreign Application Priority Data

Apr. 4, 2002 (JP) ........................................ 2002-102899

(51) Int. Cl.[7] .......................... H02K 23/02; H02K 1/14; H02K 1/17
(52) U.S. Cl. ................... 310/181; 310/154.28; 310/254
(58) Field of Search ................................. 310/154, 165, 310/177, 181, 254

(56) References Cited

U.S. PATENT DOCUMENTS

| | | | | |
|---|---|---|---|---|
| 3,984,711 A | * | 10/1976 | Kordik | 310/49 R |
| 6,051,904 A | | 4/2000 | Akemakou | 310/171 |
| 6,242,834 B1 | * | 6/2001 | Akemakou | 310/162 |
| 6,342,746 B1 | * | 1/2002 | Flynn | 310/181 |
| 6,563,248 B2 | * | 5/2003 | Fujita | 310/181 |
| 2002/0084714 A1 | | 7/2002 | Fujita | 310/181 |

FOREIGN PATENT DOCUMENTS

| | | | |
|---|---|---|---|
| JP | 02-266859 | 10/1990 | .......... H02K/23/04 |
| JP | 2000-150228 | 5/2000 | .............. H01F/7/02 |
| JP | 2002-247824 | 8/2002 | .......... H02K/23/02 |

* cited by examiner

Primary Examiner—Burton Mullins
(74) Attorney, Agent, or Firm—Colin P. Cahoon; Garstens, Yee & Cahoon, L.L.P.

(57) ABSTRACT

A DC motor has a stator that is constituted as a hybrid magnet. The stator has a plurality of electromagnets and permanent magnets that are alternately arranged in the circumferential direction of the stator. Fixed cores of the electromagnets have pole cores that have an approximately arched cross-sectional shape. When direct current is supplied to fixed coils, the pole cores are alternately magnetized to be N- and S-poles in the circumferential direction of the stator. The permanent magnets are anisotropic magnets. The inner surface of the permanent magnet includes a first portion that is arranged in one of both sides in the circumferential direction and magnetized to be an S-pole and a second portion that is arranged in the other of both sides in the circumferential direction and magnetized to be an N-pole. The first portion contacts the pole core that is magnetized to be an S-pole and the second portion contacts the pole core that is magnetized to be an N-pole. Accordingly, the DC motor, which achieves little leakage of magnetic flux and simple constitution, is obtained.

21 Claims, 4 Drawing Sheets

HYBRID MAGNET TYPE DC MOTOR

BACKGROUND OF THE INVENTION

The present invention relates to a hybrid magnet type DC motor having a stator that includes a coil and a permanent magnet.

A small motor, which consumes little electricity and brings high level torque, has widely been used in the field of, for example, automobile, office automation hardware, vending machine and medical and welfare equipment. Most of the motors used in these fields are normally comprised of a permanent magnet. This kind of motor has been grown technically and it is difficult to achieve high efficiency, reduction in size and weight and high level torque. Then, a hybrid magnet type DC motor 50 shown in FIG. 6 has been proposed.

As shown in FIG. 6, the DC motor 50 has a cylindrical yoke 55 and an armature 51 that is accommodated in the yoke 55. The armature 51 has a rotation core 53 that is fitted around a rotation shaft 52 and a plurality of rotation coils 54 that are wound around the rotation core 53. The rotation core 53 has a plurality of tees 53a that radiate in all direction. A stator 56 is fixed to the inner surface of the yoke 55. The stator 56 includes a pair of electromagnets 57, 58 and a pair of permanent magnets 59, 60 and constitutes a hybrid magnet. A prescribed gap is provided between the stator 56 and the outer surface of the armature 51. The gap is so small that it is not visibly illustrated in FIG. 6.

The electromagnets 57, 58 have fixed cores 61, 62 and fixed coils 63, 64 that are wound around portions of the fixed cores 61, 62. The fixed cores 61, 62 have at one end pole cores 65, 66 that are made by semi-cylindrical plates. The fixed coils 63, 64 are wound around portions of the fixed cores 61, 62 (the portions shown by broken lines) that radially project from the pole cores 65, 66. The pole cores 65, 66 face to the tees 53a of the armature 51 with the prescribed gap in between. The pole cores 65, 66 have extending portions 65a, 66a that extend in the circumferential direction of the stator 56 beyond both ends of the corresponding fixed coils 63, 64. The outer surfaces of the extending portions 65a, 66a contact the inner surfaces of the permanent magnets 59, 60.

The permanent magnet 59 has two magnet pieces: a first magnet piece 59a and a second magnet piece 59b, while the permanent magnet 60 has two magnet pieces: a first magnet piece 60a and a second magnet piece 60b. The magnet pieces 59a, 59b, 60a, 60b have a sectorial cross-sectional shape. The magnet pieces 59a and 59b of the permanent magnet 59 are arranged such that the magnetic direction of the first magnet piece 59a is opposite to that of the second magnet piece 59b. The magnet pieces 60a and 60b of the permanent magnet 60 are arranged such that the magnetic direction of the magnet piece first 60a is opposite to that of the second magnet piece 60b. Specifically, the first magnet pieces 59a, 60a of the permanent magnets 59, 60 are magnetized to be an N-pole at their inner surfaces and an S-pole at their outer surfaces. The second magnet pieces 59b, 60b of the permanent magnets 59, 60 are magnetized to be an S-pole at their inner surfaces and an N-pole at their outer surfaces. A resin piece T, which functions as a magnetic insulator T, is provided between the first and second magnet pieces 59a, 59b. Similarly, the resin piece T is provided between the first and second magnet pieces 60a, 60b.

Core plates 67 contact the outer surfaces of the permanent magnets 59, 60. The magnetism of the first and second magnet pieces 59a, 59b, 60a, 60b passes through the corresponding core plates 67. The insulators 68, which are made of resin, are located between the core plates 67 and the fixed yoke 55. The insulators 68 magnetically insulate the corresponding permanent magnets 59, 60 from the fixed yoke 55. Accordingly, magnetic flux, which is produced in the permanent magnets 59, 60, passes through the pole cores 65, 66.

In the above DC motor 50, the contacting area of the pole cores 65, 66 and the permanent magnets 59, 60 can be increased, which increases torque of the motor 50, without increasing the diameter of the yoke 55.

In the above DC motor 50, however, the magnetic flux produced between the magnet pieces 59a, 59b of the permanent magnet 59 and the magnet pieces 60a, 60b of the permanent magnet 60 flows through the corresponding core plates 67. The insulators 68 are located to prevent the magnet flux from leaking to the yoke 55. When the magnetism of the permanent magnets 59, 60 is increased, however, the magnetic flux produced in the permanent magnets 59, 60 leaks to the yoke 55 through the insulators 68. Accordingly, the magnetic flux cannot be efficiently used.

The permanent magnets 59, 60 have the magnet pieces 59a, 59b, 60a, 60b and the resin pieces T that magnetically separate the magnet pieces from each other. The DC motor 50 further includes the core plates 67 through which the magnetism from the corresponding magnet pieces permeates and the insulators 68 that magnetically separate the permanent magnets 59, 60 from the fixed yoke 55. Thus, the number of parts that constitute the DC motor 50 is increased, which complicates the assembly of the motor 50.

SUMMARY OF THE INVENTION

Accordingly, it is an objective of the present invention to provide a hybrid magnet type DC motor in which magnetic flux does not leak much and the structure is simple.

To achieve the above objective, the present invention provides a hybrid magnet type DC motor including a commutation device, an armature, a cylindrical stator and a fixed yoke. The armature has a rotation core and a plurality of rotation coils that are wound around the rotation core. Direct current is supplied to the rotation coils through the commutation device. The cylindrical stator is constituted as a hybrid magnet. The cylindrical stator has a circumferential direction, a radial direction, and an axial direction. The stator has a plurality of electromagnets and permanent magnets that are alternately arranged in the circumferential direction of the stator. Each electromagnet has a fixed core and a fixed coil that is wound around the fixed core. Each fixed core has a pole core that faces to the rotation core and has an approximately arched cross-sectional shape. When direct current is supplied to the fixed coils, the pole cores are alternately magnetized to be N- and S-poles in the circumferential direction of the stator. The fixed yoke through which magnetism permeates is magnetically separated from the permanent magnets and contacts the fixed cores. The permanent magnets are anisotropic magnets. Each permanent magnet includes a first curved surface and a second curved surface opposite to the first curved surface. The first curved surface is magnetized and the second curved surface is non-magnetized. The first curved surface of each permanent magnet contacts two pole cores that are arranged in both sides of each permanent magnet in the circumferential direction of the stator and have different polarities from each other. The first curved surface has an S-pole portion and an N-pole portion. The S-pole portion is provided in one side of the first curved surface in the circumferential direction and the N-pole portion is provided in the other side of the first curved surface in the circumferential direction. The S-pole portion contacts the pole core that is magnetized to be an S-pole and the N-pole portion contacts the pole core that is magnetized to be an N-pole.

Other aspects and advantages of the invention will become apparent from the following description, taken in conjunction with the accompanying drawings, illustrating by way of example the principles of the invention.

BRIEF DESCRIPTION OF THE DRAWINGS

The invention, together with objects and advantages thereof, may best be understood by reference to the following description of the presently preferred embodiments together with the accompanying drawings in which.

DETAILED DESCRIPTION OF THE PREFERRED EMBODIMENTS

An embodiment of the present invention will now be described with reference to FIGS. 1 to 5.

Figure 1:
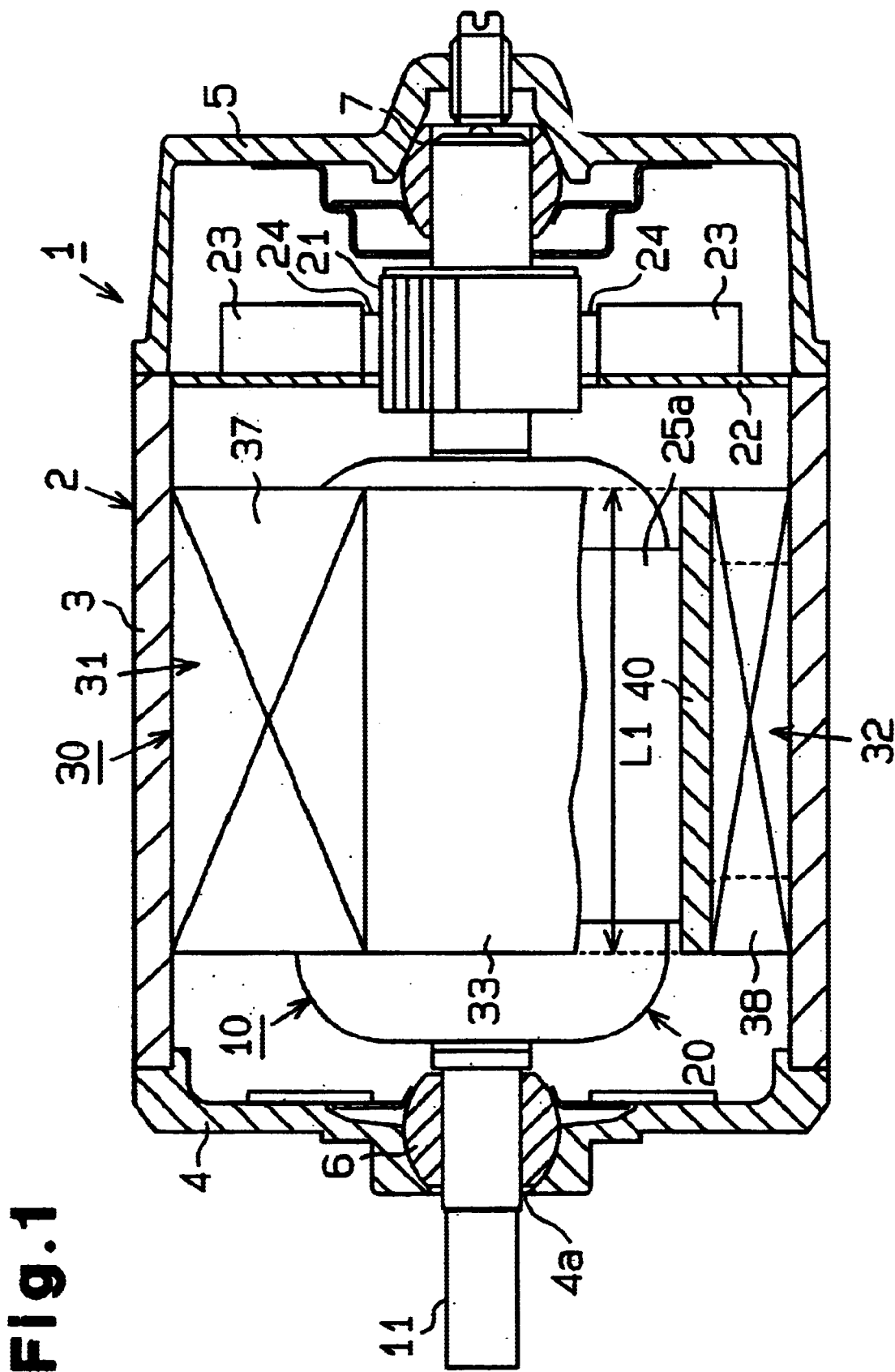
FIG. 1 is a diagram showing a side cross section of a DC motor according to a preferred embodiment of the present invention.

As shown in FIG. 1, a hybrid magnet type DC motor 1 has a housing 2. The housing 2 has a cylindrical fixed yoke 3, a front end frame 4 that is fixed to the front end of the fixed yoke 3 and a rear end frame 5 that is fixed to the rear end of the fixed yoke 3. The fixed yoke 3 through which magnetism permeates is made of soft iron. Bearings 6, 7 are arranged in the middle portions of the end frames 4, 5, respectively. The housing 2 accommodates a rotor 10.

The rotor 10 has a rotation shaft 11 that is supported by the bearings 6, 7. The front end of the rotation shaft 11 protrudes through the aperture 4a of the front end frame 4 outside the housing 2.

The DC motor 1 is a brush type DC motor. That is, the rotor 10 has an armature 20 and a commutator 21 that are fixed on the rotation shaft 11. The commutator 21 is arranged near the rear end of the rotation shaft 11. A plate 22, which is approximately disc-shaped, is located such that it divides the inner space of the fixed yoke 3 from the inner space of the rear end frame 5. Two brush holders 23 are supported on the plate 22. Each brush holder 23 holds a brush 24. The brushes 24 contact the outer surface of the commutator 21 with the commutator 21 in between the brushes 24. Direct current is supplied to the brushes 24 from the outside source via a wire and a connector, which are not shown. The commutator 21, the brush holders 23, and the brushes 24 constitute a commutation device.

Figure 2:
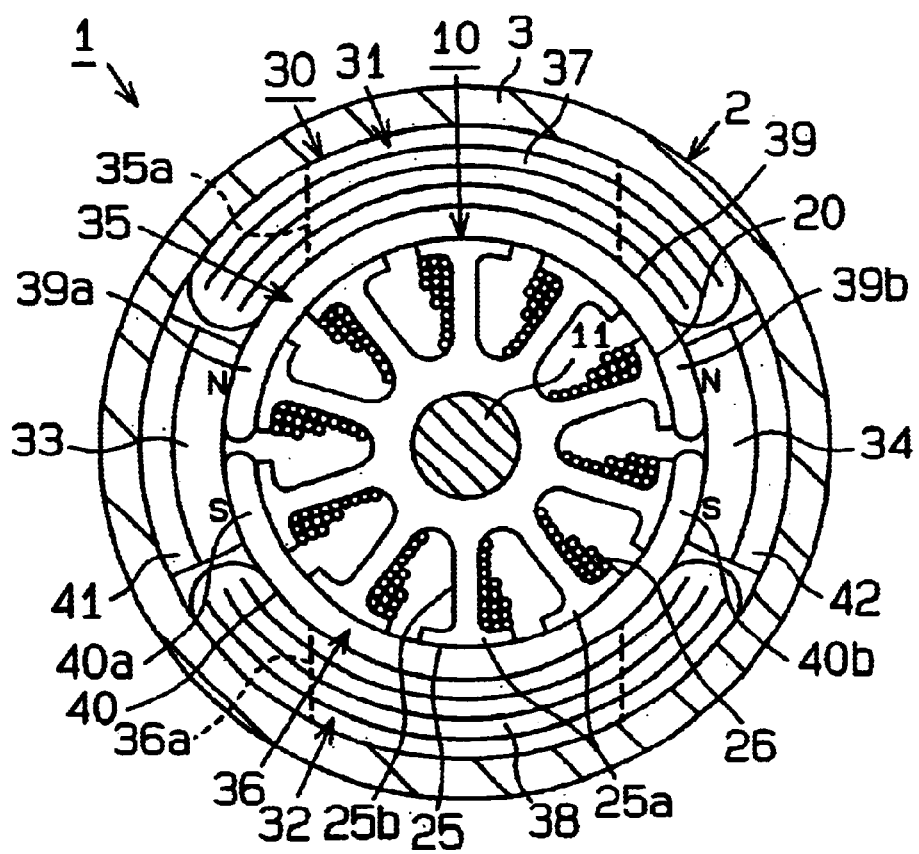
FIG. 2 is a diagram showing a front cross section of the DC motor in FIG. 1.

As shown in FIG. 2, the armature 20 has a rotation core 25 that is fixed on the rotation shaft 11 and a plurality of coils 26 that are wound around the rotation core 25. The coils 26 are hereinafter referred to as rotation coils. The rotation core 25 has a plurality of tees 25a that radiate in all direction. In this embodiment, the number of the tees 25a is ten and the tees 25a are separated from adjacent tees 25a at an equal interval.

The space that is defined by the adjacent tees 25a forms a slot 25b. The rotation coils 26 are wound around the teeth 25a and accommodated in the slots 25b. Direct current is supplied to the rotation coils 26 via the brushes 24 and the commutator 21, which are shown in FIG. 1.

A stator 30, which is approximately ring-shaped, is fixed to the inner surface of the fixed yoke 3. The stator 30 faces to the outer surface of the armature 20 with a prescribed gap in between. The gap is so small that it is not visibly illustrated in FIG. 2. The stator 30 of this embodiment includes first and second electromagnets 31, 32 and first and second permanent magnets 33, 34 and constitutes a hybrid magnet. The fixed yoke 3 surrounds the hybrid magnet and the armature 20.

The constitution of the stator 30 will now be described. The first and second electromagnets 31, 32 are arranged opposite to each other with the armature 20 in between. The first and second electromagnets 31, 32 have first and second fixed cores 35, 36 and first and second fixed coils 37, 38 that are wound around portions of the fixed cores 35, 36. The fixed cores 35, 36 have pole cores 39, 40, which are made by semi-cylindrical plates, and projections 35a, 36a (the portions shown by broken lines), which radially project from the pole cores 39, 40. The fixed coils 37, 38 are wound around the projections 35a, 36a.

The pole cores 39, 40 are arranged to face to the tees 25a of the armature 20 with the prescribed gap in between. The projections 35a, 36a extend from the circumferentially middle portion of the pole cores 39, 40 outward in the radial direction. The projections 35a, 36a contact the inner surface of the fixed yoke 3. The axis of the fixed coils 37, 38 extends perpendicularly to the axis of the armature 20, that is, the axis of the fixed coils 37, 38 extends in the radial direction of the armature 20. Specifically hollows of the fixed coils 37, 38 face to the armature 20. The fixed coils 37, 38 have an approximately arched shape when viewed from the axis direction of the DC motor 1.

Direct current is supplied to the fixed coils 37, 38 from an external source via a wire and a connector, which are not shown. When a start switch (not shown) that drives the DC motor 1 is turned on, direct current is supplied to the rotation coils 26 and the fixed coils 37, 38. The winding direction of the first fixed coils 37 is opposite to that of the second fixed coils 38 when viewed from the outer peripheral side of the DC motor 1. When the fixed coils 37, 38 are excited by direct current, the pole core 39 of the first electromagnet 31, which is located in the upper side in FIG. 2, is magnetized to be an N-pole and the pole core 40 of the second electromagnet 32, which is located in the lower side in FIG. 2, is magnetized to be an S-pole.

The pole cores 39, 40 have extending portions 39a, 39b, 40a, 40b that extend in the circumferential direction of the stator 30 beyond both ends of the corresponding fixed coils 37, 38. The extending portions 39a, 39b of the pole core 39 are arranged opposite to the extending portions 40a, 40b of the pole core 40 with a prescribed interval in between.

The first and second permanent magnets 33, 34 are arranged opposite to each other with the armature 20 in between. The permanent magnets 33, 34 have an arched-plate shape and the length of the permanent magnets 33, 34 in the axial direction is the same as that of the pole cores 39, 40. The length of the permanent magnets 33, 34 and the pole cores 39, 40 in the axial direction are shown with a mark of L1 in FIG. 1. As shown in FIG. 2, the inner surface (inner curved surface) of the first permanent magnet 33 contacts the extending portion 39a of the first pole core 39 and the extending portion 40a of the second pole core 40. The inner surface (inner curved surface) of the second permanent magnet 34 contacts the extending portion 39b of the first pole core 39 and the extending portion 40b of the second pole core 40.

Spacers 41, 42, which have the sectorial cross-sectional shape, are provided between the outer surfaces (outer curved surfaces) of the permanent magnets 33, 34 and the inner surface of the fixed yoke 3. The permanent magnets 33, 34 are held by the corresponding spacers 41, 42 and the pole cores 39, 40. The spacers 41, 42 are made of a magnetic insulator such as resin.

Figure 3:
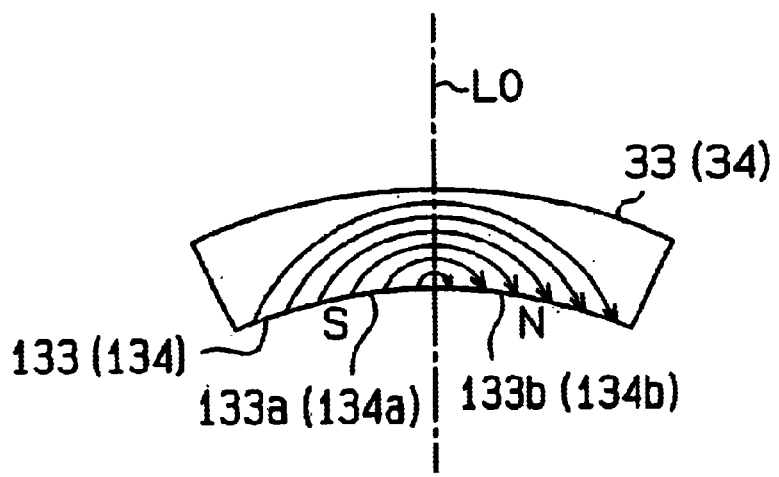
FIG. 3 is a diagram for explaining magnetic flux produced in permanent magnets of the DC motor in FIG. 1.

The permanent magnets 33, 34 of this embodiment are the anisotropic permanent magnets and magnetized to be an N-pole and an S-pole at their inner surfaces that contact the pole cores 39, 40. Specifically, the inner surface 133 (134) of the permanent magnet 33 (34) forms a magnetized surface (the surface on which magnetic flux is produced), as shown in FIG. 3. The outer surface of the permanent magnet 33 (34), which is opposite to the inner surface 133 (134), forms a non-magnetized surface (the surface on which magnetic flux is not produced). A first portion 133a (134a), which is the area of the inner surface 133 (134) toward one of the both sides (left side in FIG. 3) from the middle portion in the circumferential direction (a center line L0), is magnetized to be an S-pole and a second portion 133b (134b), which is the area of the inner surface 133 (134) toward the other of the both sides (right side in FIG. 3) from the middle portion in the circumferential direction, is magnetized to be an N-pole. The magnetic flux produced in the permanent magnet 33 (34) passes through the inside of the permanent magnet 33 (34) along a curved line from the S-pole of the first portion 133a (134a) to the N-pole of the second portion 133b (134b). The magnetic flux then reaches outside the permanent magnet 33 (34).

Figure 5:
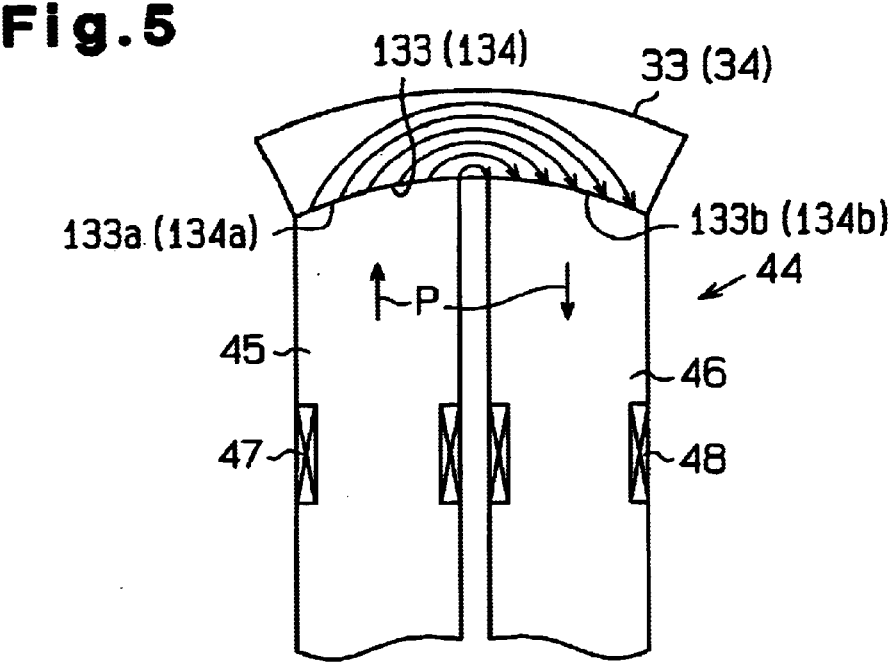
FIG. 5 is a diagram for explaining the method for magnetizing the permanent magnets of the DC motor in FIG. 1.

The permanent magnets 33, 34 are manufactured with a magnetizing device 44 shown in FIG. 5. The magnetizing device 44 has a first magnetizing yoke 45 that corresponds to the first portion 133a (134a) and a second magnetizing yoke 46 that corresponds to the second portion 133b (134b). The end faces of the magnetizing yokes 45, 46 are formed have arc faces the radius of curvature of which is the same as that of the inner surface 133 (134) of the permanent magnet 33 (34). First coil 47 is wound around the first magnetizing yoke 45 and second coil 48 is wound around the second magnetizing yoke 46.

The first portion 133a (134a) of the permanent magnet 33 (34) contacts the end face of the first magnetizing yoke 45. The second portion 133b (134b) of the permanent magnet 33 (34) contacts the end face of the second magnetizing yoke 46. When current is supplied to the first and second coils 47, 48 in this condition, the magnetic flux the direction of which is shown by an arrow P in FIG. 5 is produced between the magnetizing yokes 45, 46. The magnetic flux enters into the permanent magnet 33 (34) from the first magnetizing yoke 45 via the first portion 133a (134a). The magnetic flux passes through the inside of the permanent magnet 33 (34) along a curved line. The magnetic flux then enters into the second magnetizing yoke 46 via the second portion 133b (134b). Accordingly, the permanent magnet 33 (34) having the first portion 133a (134a) that is magnetized to be an S-pole and the second portion 133b (134b) that is magnetized to be an N-pole is obtained. The magnetic flux of the permanent magnet 33 (34) is approximately directed in the radial direction of the motor 1 near the inner surface 133 (134) and in the circumferential direction of the DC motor 1 inside the permanent magnet 33 (34), which is shown in FIG. 3.

Figure 4A:
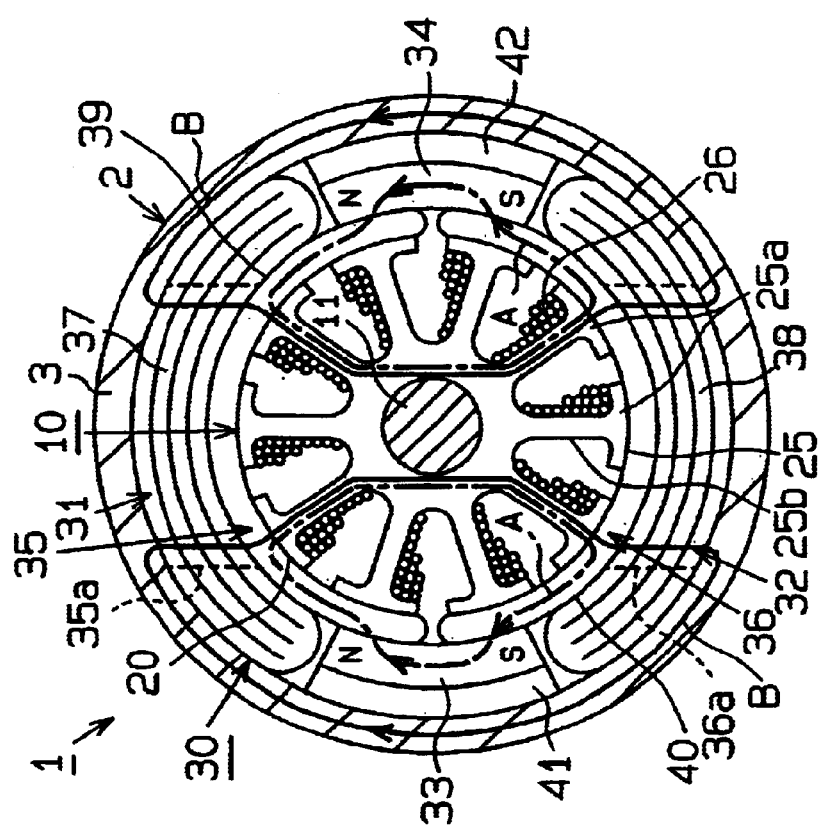
FIGS. 4A and 4B are diagrams showing a front cross section for explaining the operation of the DC motor in FIG. 1.
Figure 4B:
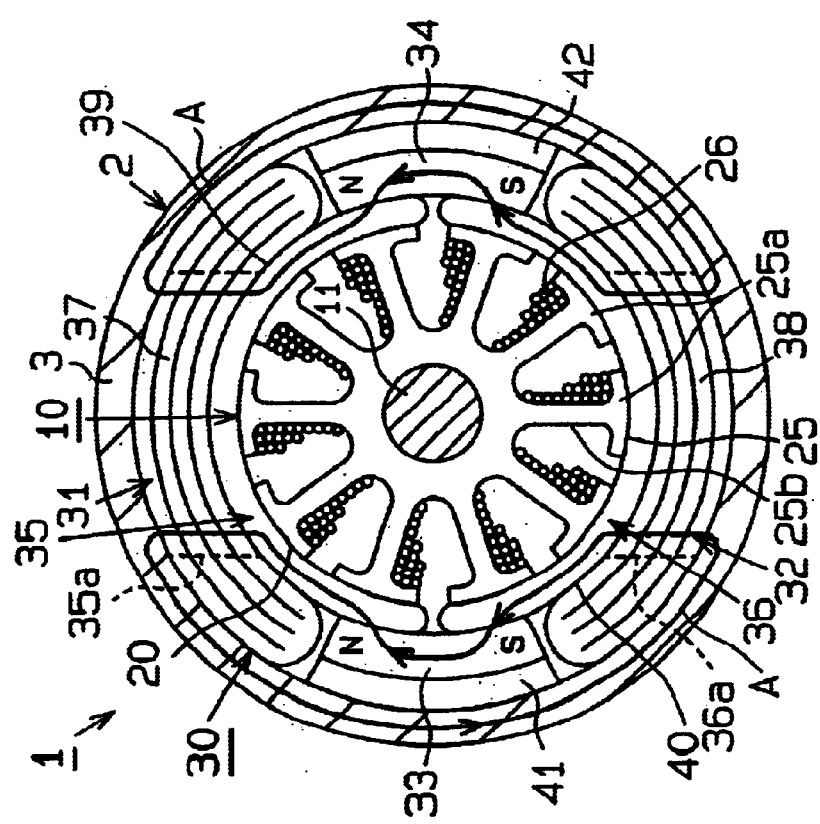

The operation of the DC motor 1 will now be described with reference to FIGS. 4A and 4B. In FIG. 4A, direct current is not supplied to the DC motor 1. In FIG. 4B, direct current is supplied to the DC motor 1.

During the off state of the drive switch, direct current does not flow in the rotation coils 26 and the fixed coils 37, 38. In this state, the magnetic force line A of the permanent magnets 33, 34 makes a closed circuit that passes through the stator 30 and the fixed yoke 3, as shown in FIG. 4A. Thus, cogging torque of the DC motor 1 becomes zero if the leakage of the magnetic flux is ignored. Therefore, cogging is hardly produced when the DC motor 1 is started to drive.

When the drive switch is turned on, direct current flows through the rotation coils 26 via the brushes 24 and the commutator 21. At that time, direct current flows through the fixed coils 37, 38. The direction of direct current flowing through the rotation coils 26 is switched in accordance with the rotation of the rotor 10. In the condition of the armature 20 shown in FIG. 4B, the left tees 25a are magnetized to be an N-pole and the right tees 25a are magnetized to be an S-pole. In the condition of the stator 30 shown in FIG. 4B, the upper, first electromagnet 31 produces an N-pole magnetic field and lower, second electromagnet 32 produces an S-pole magnetic field by current flowing through the fixed coils 37, 38. Specifically, the upper pole core 39 is magnetized to be an N-pole and the lower pole core 40 is magnetized to be an S-pole.

In FIG. 4B, each of the left tees 25a, which is magnetized to be an N-pole, receives the repulsive force from the upper, first pole core 39, which is magnetized to be an N-pole, and the sucking force from the lower, second pole core 40, which is magnetized to be an S-pole. Each of the right tees, which is magnetized to be an S-pole, receives the repulsive force from the lower, second pole core 40, which is magnetized to be an S-pole, and the sucking force from the upper, first pole core 39, which is magnetized to be an N-pole. Thus, the rotation driving force the direction of which is counterclockwise in FIG. 4B is acted on the rotor 10, which rotates the rotor 10.

During rotation of the rotor 10, as shown in FIG. 4B, each magnetic force line B formed between the fixed coils 37, 38 makes a closed circuit. The magnetic force line A produced by the permanent magnets 33, 34 is effected by the corresponding magnetic force line B that is produced by the fixed coils 37, 38 and drawn toward the center of the rotor 10 via the pole cores 39, 40 and tees 25a. In result, the direction of the magnetic force line A becomes the same as that of the corresponding magnetic force line B. This amplifies the magnetic force line that passes through the stator 30 and the armature 20, which rotates the DC motor 1 with high-level torque.

The preferred embodiment has the following advantages.

The permanent magnets 33, 34 contact the electromagnets 31, 32 that are arranged in both sides of the permanent magnets 33, 34. During the rotation of the DC motor 1, the direction of the magnetic flux produced by the permanent magnets 33, 34 is the same as that produced by the electromagnets 31, 32. This increases the magnetic flux that passes through the stator 30 and the armature 20. Therefore, the DC motor 1 exerts high-level torque.

The permanent magnets 33, 34 are anisotropic magnets. Specifically, the inner surfaces 133, 134 of the permanent magnets 33, 34 include the first portions 133a, 134a that are magnetized to be S-poles and the second portions 133b, 134b that are magnetized to be N-poles. The outer surfaces of the permanent magnets 33, 34 are non-magnetized. The magnetic flux produced in the permanent magnets 33, 34 passes through the inside of the permanent magnets 33, 34 along the curved line from the S-poles of the first portions 133a, 134b to the N-poles of the second portions 133b, 134b. Therefore, leakage of the magnetic flux from the outer surfaces of the permanent magnets 33, 34 to the fixed yoke 3 is prevented.

Figure 6:
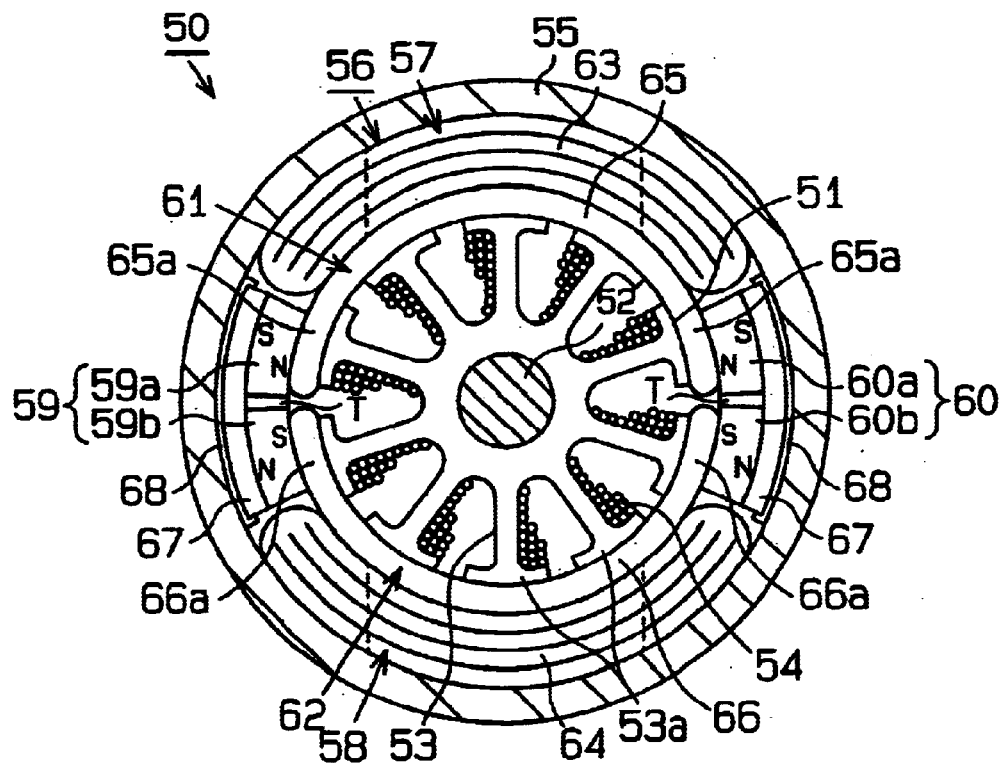
FIG. 6 is a diagram showing a front cross section of a prior-art hybrid magnet type DC motor.

By adapting the anisotropic permanent magnets 33, 34, the number of parts is reduced as compared with the DC motor 50 in FIG. 6 in which two magnet pieces and magnetism permeable members constitute a magnetic circuit. Therefore, the constitution of the DC motor 1 is simplified and the assembly of the DC motor 1 is facilitated, which reduces the cost.

In this embodiment, the length of the permanent magnets 33, 34 in the axis direction is the same as that of the pole cores 39, 40. The large contacting area of the permanent magnets 33, 34 and the pole cores 39, 40 is preferable to obtain the enormous magnetic effect. Even if the length of the permanent magnets 33, 34 in the axis direction is longer than that of the pole cores 39, 40, the magnetic effect does not change. When the length of the permanent magnets 33, 34 in the axis direction is the same as that of the pole cores 39, 40, reduction in weight and size as well as the enormous magnetic effect is achieved.

The hollows of the fixed coils 37, 38 face to the armature 20. The magnetic flux produced in the electromagnets 31, 32 is preferably led to the armature 20 and effectively used to generate motor torque.

It should be apparent to those skilled in the art that the present invention may be embodied in many other specific forms without departing from the spirit or scope of the invention. Particularly, it should be understood that the invention may be embodied in the following forms.

The spacers 41, 42 may be omitted and a space may be provided between the permanent magnets 33, 34 and the fixed yoke 3 to insulate magnetism.

The present invention may be embodied in an outer rotor type motor as well as the inner rotor type motor of the embodiment shown in FIGS. 1 to 5.

The number of the electromagnets provided in the stator 30 is not limited to two. The number of the electromagnets may be an even number other than two as long as the stator 30 is alternately magnetized to be N- and S-poles in the circumferential direction.

Therefore, the present examples and embodiments are to be considered as illustrative and not restrictive and the invention is not to be limited to the details given herein, but may be modified within the scope and equivalence of the appended claims.

What is claimed is:

1. A hybrid magnet type DC motor comprising:
   a commutation device;
   an armature having a rotation core and a plurality of rotation coils that are wound around the rotation core, wherein direct current is supplied to the rotation coils through the commutation device;
   a cylindrical stator that is constituted as a hybrid magnet, said cylindrical stator having a circumferential direction, a radial direction, and an axial direction, wherein the stator has a plurality of electromagnets and permanent magnets that are alternately arranged in the circumferential direction of the stator, wherein each electromagnet has a fixed core and a fixed coil that is wound around the fixed core, wherein each fixed core has a pole core that faces the rotation core and has an approximately arched cross-sectional shape, wherein, when direct current is supplied to the fixed coils, the pole cores are alternately magnetized to be N- and S-poles in the circumferential direction of the stator; and
   a fixed yoke through which magnetism permeates, wherein the fixed yoke is magnetically separated from the permanent magnets and contacts the fixed cores,
   wherein the permanent magnets are anisotropic magnets, wherein each permanent magnet includes a first curved surface and a second curved surface opposite to the first curved surface, the first curved surface being magnetized and the second curved surface being non-magnetized, wherein the first curved surface of each permanent magnet contacts two pole cores that are arranged on both sides of each permanent magnet in the circumferential direction of the stator and have different polarities from each other, wherein the first curved surface has an S-pole portion and an N-pole portion, the S-pole portion being provided on one side of the first curved surface on the circumferential direction and the N-pole portion being provided on the other side of the first curved surface in the circumferential direction, and wherein the S-pole portion contacts the pole core that is magnetized to be an S-pole and the N-pole portion contacts the pole core that is magnetized to be an N-pole.

2. The motor according to claim 1, wherein the magnetic flux produced in each permanent magnet passes through the inside of the permanent magnet along a curved line from the S-pole portion to the N-pole portion without leaking from the second curved surface.

3. The motor according to claim 1, wherein each pole core has two ends in the circumferential direction of the stator and each pole core has extending portions at both ends, wherein the extending portions contact two permanent magnets that are arranged on both sides of each pole core on the circumferential direction.

4. The motor according to claim 1, wherein each permanent magnet has a length in the axial direction of the stator that is the same as a length of each pole core in the axial direction.

5. The motor according to claim 1, wherein each fixed core has a projection that extends in the radial direction of the stator from the pole core and wherein each fixed coil is wound around the projection.

6. The motor according to claim 5, wherein each projection contacts the fixed yoke.

7. The motor according to claim 1, wherein the fixed yoke is cylindrical and accommodates the armature and the stator.

8. The motor according to claim 7, wherein the fixed yoke has an inner surface and the stator is fixed to the inner surface of the fixed yoke and is arranged around the armature.

9. The motor according to claim 8, wherein each fixed core has a projection that extends outward in the radial direction of the stator from a middle portion of the pole core in the circumferential direction and wherein each fixed coil is wound around the projection.

10. The motor according to claim 9, wherein the projection contacts the inner surface of the fixed yoke.

11. The motor according to claim 8, wherein the first curved surface of each permanent magnet is an inner curved surface that is located inside, in the radial direction, and wherein the second curved surface of each permanent magnet is an outer curved surface that faces the inner surface of the fixed yoke.

12. The motor according to claim 11, wherein a spacer that is made of a magnetic insulator is provided between the outer curved surface of each permanent magnet and the inner surface of the fixed yoke.

13. The motor according to claim 8, wherein each pole core has two ends in the circumferential direction of the stator and each pole core has extending portions at both ends, wherein the extending portions contact two permanent magnets that are located on both sides of each pole core on the circumferential direction.

14. The motor according to claim 8, wherein each permanent magnet has a length in the axial direction of the stator that is the same as a length of each pole core in the axial direction.

15. The motor according to claim 1, wherein the number of electromagnets is an even number.

16. A hybrid magnet type DC motor comprising:
  a commutation device;
  an armature having a rotation core and a plurality of rotation coils that are wound around the rotation core, wherein direct current is supplied to the rotation coils through the commutation device;
  a cylindrical stator that is constituted as a hybrid magnet, said cylindrical stator having a circumferential direction, a radial direction, and an axial direction, wherein the stator surrounds the armature, wherein the stator has a plurality of electromagnets and permanent magnets that are alternately arranged in the circumferential direction of the stator, wherein each electromagnet has a fixed core and a fixed coil that is wound around the fixed core, wherein each fixed core has a pole core that faces the rotation core and has an approximately arched cross-sectional shape and a projection that extends outward in the radial direction of the stator from a middle portion of the pole core in the circumferential direction, wherein the fixed coil is wound around the projection, wherein, when direct current is supplied to the fixed coils, the pole cores are alternately magnetized to be N- and S-poles in the circumferential direction of the stator; and
  a cylindrical fixed yoke through which magnetism permeates, wherein the fixed yoke accommodates the armature and the stator, wherein an inner surface of the fixed yoke is magnetically separated from the permanent magnets and contacts the projections,
  wherein the permanent magnets are anisotropic magnets, wherein each permanent magnet includes an inner curved surface and an outer curved surface opposite to the inner curved surface in the radial direction of the stator, the inner curved surface being magnetized and the outer curved surface being non-magnetized, wherein the inner curved surface of each permanent magnet contacts two pole cores that are arranged on both sides of each permanent magnet in the circumferential direction of the stator and have different polarities from each other, wherein the inner curved surface has an S-pole portion and an N-pole portion, the S-pole portion being provided on one side of the inner curved surface on the circumferential direction and the N-pole portion being provided on the other side of the inner curved surface on the circumferential direction, and wherein the S-pole portion contacts the pole core that is magnetized to be an S-pole and the N-pole portion contacts the pole core that is magnetized to be an N-pole.

17. The motor according to claim 16, wherein the magnetic flux produced in each permanent magnet passes through the inside of the permanent magnet along a curved line from the S-pole portion to the N-pole portion without leaking from the outer curved surface.

18. The motor according to claim 16, wherein the outer curved surface of each permanent magnet faces the inner surface of the fixed yoke, wherein a spacer that is made of a magnetic insulator is provided between the outer curved surface of each permanent magnet and the inner surface of the fixed yoke.

19. The motor according to claim 16, wherein each pole core has two ends in the circumferential direction of the stator and each pole core has extending portions at both ends, wherein the extending portions contact two permanent magnets that are arranged on both sides of each pole core on the circumferential direction.

20. The motor according to claim 16, wherein each permanent magnet has a length in the axial direction of the stator that is the same as a length of each pole core in the axial direction.

21. The motor according to claim 16, wherein the number of electromagnets is an even number.

* * * * *